United States Patent [19]

Mory

[11] 4,028,322

[45] June 7, 1977

[54] 6-METHYLBENZIMIDAZOLONYLAZOBARBITURIC ACID PIGMENT

[75] Inventor: Rudolf Mory, Dornach, Switzerland

[73] Assignee: Ciba-Geigy Corporation, Ardsley, N.Y.

[22] Filed: Sept. 12, 1975

[21] Appl. No.: 612,591

Related U.S. Application Data

[63] Continuation-in-part of Ser. No. 379,527, July 16, 1973, abandoned.

[30] Foreign Application Priority Data

July 13, 1972 Switzerland ............... 10526/72

[52] U.S. Cl. ........................ 260/154; 106/23; 106/288 Q; 106/308 Q; 260/37 R; 260/37 N; 260/37 NP; 260/39 P; 260/40 E; 260/40 P; 260/42.21; 260/208; 260/247.5 G; 260/256.4 C; 260/256.5 R; 260/257; 260/309.2

[51] Int. Cl.² ............... C09B 29/36; C09D 11/00; D06P 1/08; D06P 3/00

[58] Field of Search ............ 260/154, 87.7; 106/23; 428/500

[56] References Cited

UNITED STATES PATENTS

| 2,140,987 | 12/1938 | Dickey ................... 260/154 X |
| 2,283,220 | 5/1942 | McNally et al. ............ 260/154 X |
| 2,827,451 | 3/1958 | Tolone et al. .............. 260/154 |
| 3,086,003 | 4/1963 | Baumann et al. ............ 260/146 R |
| 3,116,278 | 12/1963 | Gross et al. ................ 260/146 D |
| 3,435,022 | 3/1969 | Voltz ......................... 260/147 |
| 3,773,749 | 11/1973 | Horstmann et al. .......... 260/152 |

FOREIGN PATENTS OR APPLICATIONS 1,136,673  12/1968  United Kingdom ............. 260/154

*Primary Examiner*—Floyd D. Higel
*Attorney, Agent, or Firm*—Vincent J. Cavalieri

[57] ABSTRACT

A monoazo pigment of the formula

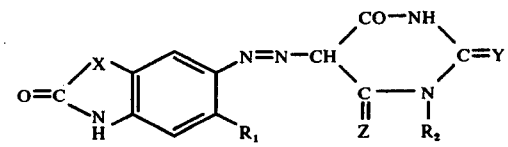

wherein $R_1$ denotes a halogen atom or an alkyl or alkoxy group containing 1 – 4 carbon atoms, $R_2$ denotes a H atom, an alkyl group containing 1 – 4 carbon atoms or a phenyl group, X denotes a —NH— or —CH$_2$O group, Y denotes an O atom or S atom or an imino group and Z denotes an O atom or an imino group are prepared. The pigments may be used to color high molecular weight organic materials such as polyamides, polyesters and polyolefins. The pigments possess excellent fastness to light, weathering and migration.

1 Claim, No Drawings

6-METHYLBENZIMIDAZOLONYLAZOBARBITURIC ACID PIGMENT

This is a continuation-in-part of our copending application Ser. No. 379,527, filed July 16, 1973 now abandoned.

According to the present invention there are provided mono azo pigments of the formula

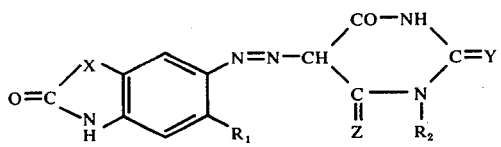

wherein $R_1$ denotes a halogen atom or an alkyl or alkoxy group containing 1 – 4 carbon atoms, $R_2$ denotes a H atom, an alkyl group containing 1 – 4 carbon atoms or a phenyl group, X denotes a —NH— or —$CH_2O$ group, Y denotes an O or S atom or an imino group and Z denotes an O atom or an imino group.

The pigments may be produced by coupling a diazo or diazoamino compound of an amine of the formula:

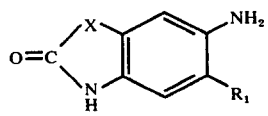

with a coupling component of the formula:

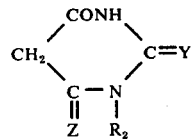

Pigments of particular interest are those of the formula:

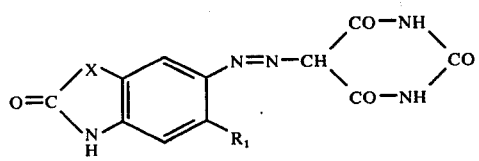

wherein $R_1$ and X have the meanings given above and especially those of the formula:

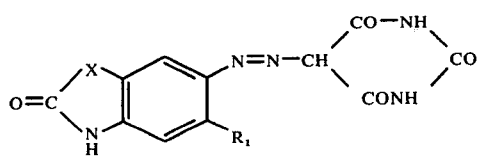

wherein $R_1$ has the meanings given above, but preferably denotes an alkyl or alkoxy group containing 1 – 4 carbon atoms.

The diazo components used are preferably derived from aminoimidazolones of the formula:

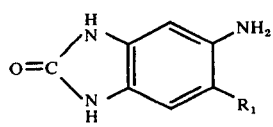

wherein $R_1$ has the indicated meaning but preferably denotes an alkyl or alkoxy group containing 1 – 4 carbon atoms.

The following diazo components may be mentioned as examples: 5-amino-6-chloro-benzimidazolone, 5-amino-6-bromo-benzimidazolone, 5-amino-6-methyl-benzimidazolone, 5-amino-6-methoxy-benzimidazolone, 5-amino-6-ethoxy-benzimidazolone, 5-amino-6-propoxy-benzimidazolone, 5-amino-6-n-butoxy-benzimidazolone, 7-amino-6-chloro-phenmorpholone-(3), 7-amino-6-methyl-phenmorpholone-(3), 7-amino-6-methoxy-phenmorpholone-(3) and 7-amino-6-ethoxy-phenmorpholone-(3).

These diazo components are known compounds.

A particularly preferred coupling component is barbituric acid, which may also be used in the form of its functional derivatives, for example N-methyl-, N-ethyl- or N-phenyl-barbituric acid, as well as its thio and imino derivatives of the formulae:

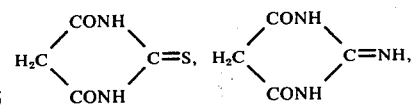

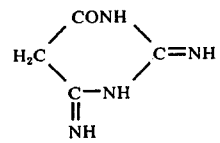

These barbituric acid derivatives are known compounds.

The coupling appropriately takes place by gradual addition of the aqueous-alkaline solution of the coupling component to the acid solution of the diazonium salt. The coupling is appropriately carried out at a pH value of from 4 to 6.

The pH value is advantageously adjusted by adding a buffer. Possible buffers are, for example, the salts, especially the alkali metal salts, of formic acid, phosphoric acid or especially acetic acid. The alkaline solution of the coupling component appropriately contains a wetting agent, dispersing agent or emulsifier, for example an aralkylsulphonate, such as dodecylbenzenesulphonate or the sodium salt of 1,1'-naphthylmethanesulphonic acid, polycondensation products of alkylene oxides, such as the reaction product of ethylene oxide with p-tert.-octylphenol, and also alkyl esters of sulphoricinoleates, for example n-butylsulphoricinoleate. The dispersion of the coupling component can also advantageously contain protective colloids, for example methylcellulose or minor amounts of inert sparingly water-soluble or insoluble organic solvents, for example optionally halogenated or nitrated aromatic hydrocarbons, such as benzene, toluene, xylene, chlorobenzene, dichlorobenzenes or nitrobenzene, as well as aliphatic halogenated hydrocarbons such as, for example, carbon tetrachloride or trichloroethylene, and also water-miscible organic solvents, such as acetone, methyl ethyl ketone, methanol, ethanol or isopropanol, but especially dimethylformamide.

Due to their insolubility, the pigments obtained can be isolated from the reaction mixtures by filtration. It is found to be advantageous to after-treat the resulting pigments with an organic solvent which preferably boils above 100° C. Particularly suitable solvents prove to be benzenes substituted by halogen atoms, alkyl groups or nitro groups, such as xylenes, chlorobenzene, o-dichlorobenzene or nitrobenzene, as well as pyridine bases, such as pyridine, picoline or quinoline, and also ketones, such as cyclohexanone, ethers, such as ethylene glycol monomethyl ether or ethylene glycol monoethyl ether, amides, such as dimethylformamide or N-methyl-pyrrolidone, and sulpholane or dimethylsulphoxide.

The after-treatment is preferably carried out by heating the pigment in the solvent to 100° – 250° C, whereupon, in many cases, a coarsening of the particle size occurs, which has a favourable effect on the fastness to light and to migration of the pigments obtained.

The coupling can also be carried out by suspending the amine to be diazotised together with the coupling component in the molar ratio of 2:1 in an organic solvent and treating it with a diazotising agent, especially an ester of nitrous acid, such as methyl nitrite, ethyl nitrite, butyl nitrite, amyl nitrite or octyl nitrite.

It has been found that the pigments of this invention are eminently suitable for coloring high molecular organic materials in the mass.

The pigments are, when synthesized, in a physically useful form, and is advantageously finely dispersed before application, for example by being ground or kneaded in a dry or moist aqueous state with or without the addition of an organic solvent and/or a salt which can be washed out.

In many cases it is of advantage, in order to convert the pigment into a finely divided form, to grind the crude pigment with the substratum to be colored or with a component of the substratum.

As high molecular materials that may be colored by the process of the invention there may be mentioned for example natural high molecular products, such as abietic acid, rubber, casein or cellulose or cellulose derivatives such as nitrocellulose, cellulose acetate, cellulose propionate, cellulose acetopropionate, cellulose acetobutyrate or carboxymethyl cellulose, and especially synthetic high molecular products, for example polymerization resins, such as vinyl polymers which are obtained by polymerizing ethylene or a monovinyl compound that is a compound which is derived from ethylene by substitution of one or both hydrogen atoms on one of the two carbon atoms of the ethylene for example by halogen atoms, alkyl, phenyl or cyano groups. As examples may be mentioned polyolefines, such as polyethylene, polypropylene, polyisobutylene, polybutadiene, polyisoprene, polystyrene or polyvinylhalides, such as polyvinylchloride or poly-(1,2-dichlorethylene) or polyvinylcyanides such as polyacrylonitrile, poly-(1,2-dicyanethylene) polymethacrylonitrile, polymethacrylic acid ester, furthermore polyacrylic acid esters, polyvinylacetate and polyvinylacetal. Instead of the homopolymers, also the copolymers of different monovinyl compounds must be mentioned, for example the copolymers of vinylchloride with vinylacetate or of vinylchloride with 1,2-dichloroethylene or of acrylonitrile with 1,2-dicyanethylene or of butadiene with sytrene. Here also the polymerization products of natural unsaturated compounds such as linseed oil must be mentioned.

The pigments to be used according to the present invention are also highly suitable in the manufacture of colored condensation resins for phenolic resins, modified phenolic resins or aminoplasts which are obtained by reacting urea or a compound or urea like character, such as thiurea, guanidine, acetylene diurea, dicyandiamide or uron. As further compounds with urea-like character the aminotriazines, especially melamine or guanamines, such as aceto-, benzo- or formoguanamine must be mentioned. The pigments are advantageously incorporated into the low molecular condensation products or above mentioned amino compounds with formaldehyde, for example, di-, tri- or tetramethylol urea, tri- or hexamethylol melamine. In place of the free methylol compounds also their ethers with low molecular aliphatic alcohols, such as methanol or butanol may be used.

Another important type of polycondensation resins to which the compounds of the invention can be applied are the polyester resins, which are obtained when an unsaturated polyester is reacted with an unsaturated polymerizable compound such as cyclopentadiene, cyclohexene, vinyl acetate, methyl methacrylate or especially styrene. The unsaturated polyesters are obtained by the polycondensation of an unsaturated polycarboxylic acid, such as maleic acid, fumaric acid, itaconic acid or their anhydrides with a polyhydric alcohol, such as ethylene glycol or polyethylene glycols. As further types of polycondensation resins there must be mentioned the linear polyesters which are obtained by the polycondensation of an aromatic dicarboxylic acid, especially terephthalic acid with an aliphatic diol, especially glycol, or the linear polyamides, which are obtained by the polycondensation of an aliphatic dicarboxylic acid with an aliphatic diamine or by the condensation of an ω-amino-fatty acid, especially ε-caprolactam or ω-aminoundecanoic acid. Both the linear polyamides and polyesters are primarily used for making fibers. For this purpose the pigments are dispersed in the melt of the polycondensates, and the pigmented melt is extruded to form fibers. Finally, also the polycarbonates must be mentioned which are obtained by the polycondensation of a dihydroxy compound for example 4,4-dihydroxy-2,2-propane with phosgene.

With the same success the pigments of this invention can also be used for the manufacture of colored polyaddition resins for example polyurethane resins which are obtained by the polyaddition of a polyhydric alcohol, with a polyisocyanate; as polyols there come into consideration, for example ethylene glycol, 1,3- or 1,4-butylene glycol, trimethylolpropane, hexantriol-1,2,6, diethylene glycol or a hydroxy group containing high molecular polyether or polyester, especially a polyester from dicarboxylic acids, such as adipic acid, maleic acid, or phthalic acid with one of the above mentioned glycols. As polyisocyanates especially the arylene diisocyanates, such as naphthylene-1,5-diisocyanate, diphenylmethane-diisocyanate, phenylene-1,4-diisocyanate, 1-methyl-phenylene-2,4-diisocyanate, or m- or p-xylylenediisocyanate must be mentioned. There may be formed coatings, molded articles or foams on the basis of colored polyurethanes. Also a very important class of polyaddition resins are the epoxy resins which are obtained by polyaddition of a condensate which is obtained by condensing in an alkaline medium epichlorohydrin or dichlorohydrin and one or more polyhydric alcohols or phenols, for example resorcin, hydroquinone, 4,4'-dihydroxybenzophenone, bis-(4-hydroxyphenyl)-1,1-ethane, bis-(4-hydroxyphenyl)-1,1-isobutane or bis-(4-hydroxyphenyl)-2,2-butane,bis-(4-hydroxyphenyl-1,1- cyclohexane or especially bis-(4-hydroxyphenyl)-2,2-propane. When these condensates are colored with the pigments of this invention and cured in the presence of catalysts, such as amines, very stable colored resins are obtained.

Since the pigments are insoluble in all organic solvents and heat resistant to a high degree they are equally suitable for coloring lacquers, paints or spinnable masses dissolved in solvents or molten spinnable masses.

Of special interest are the pigments of the invention for printing inks which comprises in general pigments binders and solvents. As binders the above mentioned high molecular organic compounds may be used, especially phenol resins, modified phenol resins, polyurethanes, thermoplastic acrylic resins, especially polymers and copolymers of alkyl esters of acrylic and methacrylic acid. Other binders are based on cellulose derivatives, for example cellulose ethers, such as ethyl cellulose, hydroxy ethyl cellulose, or cellulose ester, for example nitro cellulose, cellulose acetate, cellulose propionate or cellulose acetobutyrate. Very useful binders are also drying or semidrying oils optionally containing resin, such as linseed-oil or alkyd modified linseed-oil. If drying or semi-drying oils are used, the printing inks preferably have also a dryer such as cobalt naphtenate, cobalt octoate or lead octoate. The printing inks may also have thickeners such as gilsonite, silica or organo-metal compounds or thixotropic additives for example micronised silica or a polyamide. The printing inks can be applied to various substrates by conventional paper printing methods, such as letter press rotogravure, lithographic or offset.

The pigments can be used either in the pure form as a so-called toner or in the form of preparations in which the pigments are present in a finely divided state. Such preparations, which may contain the usual additions, for example, dispersing agents or binders, can be produced in known manner by in intense mechanical treatment, for example, on a roller mill or in a suitable kneading apparatus.

By virtue of their chemical inertness and good heat resistance, the pigments can easily be dispersed in the usual manner in the aforesaid masses and preparations, and this is advantageously carried out at a stage before the said masses and preparations have reached their final form. The operation required for giving the products their final form, as, for example, spinning, pressing, hardening, casting and cementing can easily be carried out in the presence of the pigments without interfering with any chemical reactions of the substratum, such as further polymerisation, condensation or polyaddition.

The colorations obtained with the pigments of this invention are distinguished by their excellent fastness to light, weathering, migration and overstripe bleeding as well as excellent heat stability, color strength and dispersibility.

The pigment may be used in a concentration of 0.001 to 10 % by weight based on the weight of the high molecular organic material to be pigmented and preferably in the range of from 0.01 to 5 % by weight.

In the examples which follow the parts, unless otherwise stated, denote parts by weight and the percentages denote percentages by weight.

EXAMPLE 1

1.93 parts of 5-amino-6-ethoxy-benzimidazolone in 50 parts by volume of ice water are treated with 2.5 parts by volume of 10 N hydrochloric acid and diazotised with 2.5 parts by volume of 4 N sodium nitrite solution. The clear diazo solution is poured slowly, in a thin stream, into a solution of 1.28 parts of barbituric acid in 100 parts by volume of dimethylformamide, to which 1.5 parts of anhydrous sodium acetate have also been added. The mixture is stirred for a further 6 hours at ambient temperature and the pigment formed is then filtered off and washed with water and methanol. 3.2 parts of pigment are obtained. In order to convert this into a tinctorially usable form, the pigment, in 75 parts by volume of N-methylpyrrolidone, is heated to the boil for 30 minutes. After renewed isolation and drying, 2.8 parts of the pigment or the formula

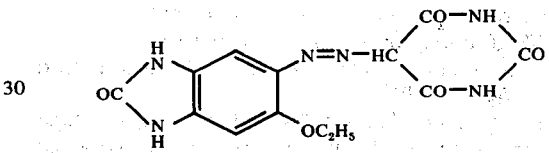

are obtained as a light red, soft powder. The pigment dyes polyvinyl chloride in a very strongly coloured yellow-red shade of outstanding fastness to light and to migration.

EXAMPLES 2 – 4

The following list contains further pigments which are obtained in the manner indicated. Column I indicates the diazo base which is coupled with barbituric acid. Column II indicates the shade which the pigment gives in polyvinyl chloride.

| Example No. | I | II |
| --- | --- | --- |
| 2 | 5-Amino-6-methyl-benzimidazolone | Orange |
| 3 | 7-Amino-6-methyl-phenmorpholone-(3) | Orange |
| 4 | 5-Amino-6-methoxy-benzimidazolone | Red |
| 5 | 7-Amino-6-chloro-phenmorpholone | Orange |

The table which follows describes further pigments which are obtained according to the process of Example 1. Column I indicates the diazo base, Column II the coupling component and Column III the shade which the pigment gives in polyvinyl chloride.

| Example No. | I | II | III |
| --- | --- | --- | --- |
| 6 | 5-amino-6-ethoxy-benzimidazolone | 2-imino-barbituric acid | red |
| 7 | 5-amino-6-methoxy-benzimidazolone | 2-imino-barbituric acid | yellow-red |
| 8 | 5-amino-6-methyl-benzimidazolone | 2-imino-barituric acid | brown |
| 9 | 7-amino-6-methyl-phenmorpholone-(3) | 2-imino-barbituric acid | yellow |
| 10 | 5-amino-6-chloro-benzimidazolone | 2-imino-barbituric acid | orange |
| 11 | 5-amino-6-ethoxy-benzimidazolone | 2,4-diimino-barbituric acid | grey-violet |
| 12 | 7-amino-6-methyl-phenmorpholone-(3) | 2,4-diimino-barbituric acid | red |
| 13 | 5-amino-6-methoxy-benzimidazolone | 2,4-diimino-barbituric acid | claret |

-continued

| Example No. | I | II | III |
| --- | --- | --- | --- |
| 14 | 5-amino-6-methyl-benzimidazolone | 2,4-diimino-barbituric acid | brown |
| 15 | 5-amino-6-chloro-benzimidazolone | 2,4-diimino-barbituric acid | ochre yellow |
| 16 | 5-amino-6-methoxy-benzimidazolone | 2-thio-barbituric acid | violet |
| 17 | 5-amino-6-methyl-benzimidazolone | 2-thio-barbituric acid | blue-red |
| 18 | 5-amino-6-ethoxy-benzimidazolone | 2-thio-barbituric acid | blue-red |
| 19 | 5-amino-6-chloro-benzimidazolone | 2-thio-barbituric acid | yellow-red |
| 20 | 7-amino-6-methyl-phenmorpholone-(3) | 1-phenyl-barbituric acid | yellow |
| 21 | 5-amino-6-methyl-benzimidazolone | 1-phenyl-barbituric acid | red-orange |
| 22 | 7-amino-6-methoxy-phenmorpholone-(3) | barbituric acid | blue-red |

EXAMPLE 23

65 parts of stabilised polyvinyl chloride, 35 parts of dioctyl phthalate and 0.2 part of the pigment obtained according to Example 1 are stirred together and the mixture is then milled on a two-roll calender for 7 minutes at 140° C. A sheet which is coloured yellow-red and has very good fastness to light and to migration is obtained.

EXAMPLE 24

1.00 g of the pigment obtained according to Example 9 and 4.00 g of a printing varnish of the following composition
- 29.4% of linseed oil-stand oil (300 poise)
- 67.2% of linseed oil-stand oil (20 poise)
- 2.1% of cobalt octoate (8% Co) and 1.3% of lead octoate (24% Pb)

are finely ground on an Engelsmann grinding machine and thereafter printed onto art printing paper by the letterpress process by means of a block, applying 1g/m². A strong, pure yellow shade of good transparency and good gloss is obtained. In three-colour or four-colour printing, very brilliant green shades can be produced by overprinting on blue.

The pigment is also suitable for other printing processes, such as gravure printing, offset printing and flexographic printing and here again gives very good results.

What we claim is:
1. The compound of the formula

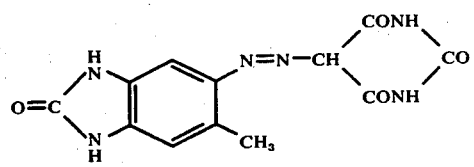

* * * * *